United States Patent
Guo et al.

(10) Patent No.: US 10,917,333 B2
(45) Date of Patent: Feb. 9, 2021

(54) IMPLEMENTATION METHOD OF UNSTRUCTURED DATA SHARING MECHANISM FOR EDGE COMPUTING AND THE SYSTEM

(71) Applicant: Deke Guo, Changsha (CN)

(72) Inventors: Deke Guo, Changsha (CN); Junjie Xie, Changsha (CN); Yang Guo, Changsha (CN); Bangbang Ren, Changsha (CN)

(73) Assignee: Deke Guo, Changsha (CN)

( * ) Notice: Subject to any disclaimer, the term of this patent is extended or adjusted under 35 U.S.C. 154(b) by 0 days.

(21) Appl. No.: 16/825,818

(22) Filed: Mar. 20, 2020

(65) Prior Publication Data

US 2020/0336408 A1 Oct. 22, 2020

(30) Foreign Application Priority Data

Apr. 16, 2019 (CN) .......................... 2019 1 03026824

(51) Int. Cl.
*H04L 12/24* (2006.01)
*H04L 12/721* (2013.01)
*H04L 12/815* (2013.01)
*H04L 9/06* (2006.01)
*H04L 12/751* (2013.01)

(52) U.S. Cl.
CPC .......... *H04L 45/123* (2013.01); *H04L 9/0643* (2013.01); *H04L 45/02* (2013.01); *H04L 47/22* (2013.01)

(58) Field of Classification Search
CPC ..... H04L 45/123; H04L 45/02; H04L 9/0643; H04L 47/22
See application file for complete search history.

(56) References Cited

U.S. PATENT DOCUMENTS

| | | | |
|---|---|---|---|
| 9,445,279 B2 * | 9/2016 | Li | H04W 16/18 |
| 9,794,192 B2 * | 10/2017 | Li | H04L 49/65 |
| 2003/0145110 A1 * | 7/2003 | Ohnishi | H04L 45/02 |
| | | | 709/242 |
| 2009/0190494 A1 * | 7/2009 | De Giovanni | H04L 45/02 |
| | | | 370/254 |
| 2015/0023354 A1 * | 1/2015 | Li | H04L 47/724 |
| | | | 370/392 |
| 2015/0124622 A1 * | 5/2015 | Kovvali et al. | H04L 67/1006 |
| | | | 370/236 |

(Continued)

*Primary Examiner* — Jay P Patel
(74) *Attorney, Agent, or Firm* — Dragon Sun Law Firm, PC; Jinggao Li, Esq.

(57) ABSTRACT

The invention discloses an implementation method of unstructured data sharing mechanism for edge computing and a system thereof, wherein the method includes the following steps: receive a data index request from a user, collect the switch, port, link and host information through the control plane to obtain the network topology and status; determine the coordinates of the switch and the coordinates of the data index in the virtual space formed by the network topology; construct a switch connection diagram according to the coordinates of the switch; insert the coordinates of the switch and forwarding entries of the switch connection diagram in the forwarding table of the switch; the data plane greedily forwards the coordinates of the data index until being transmitted to the switch corresponding to the switch coordinates closest to the coordinates of the data index in the virtual space.

14 Claims, 8 Drawing Sheets

(56) References Cited

U.S. PATENT DOCUMENTS

| | | | |
|---|---|---|---|
| 2016/0119226 A1* | 4/2016 | Guichard | H04L 45/306 |
| | | | 370/392 |
| 2016/0165454 A1* | 6/2016 | Li | H04W 16/18 |
| | | | 370/254 |
| 2017/0034039 A1* | 2/2017 | Yadlapalli | H04L 45/02 |
| 2018/0324082 A1* | 11/2018 | Hao | H04L 41/0823 |
| 2019/0166339 A1* | 5/2019 | De La Cruz | H04N 9/3185 |

* cited by examiner (a) The path lengths of retrieving indexes.

(b) The number of forwarding entries.

(a) A single index copy for each shared data.

(a) A single index copy for each shared data.

(a) A single index copy for each shared data.

(b) Three index copies for each shared data.

IMPLEMENTATION METHOD OF UNSTRUCTURED DATA SHARING MECHANISM FOR EDGE COMPUTING AND THE SYSTEM

CROSS-REFERENCE TO RELATED APPLICATIONS

This application claims priority to and the benefit of CN 2019103026824, filed Apr. 16, 2019. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD OF THE INVENTION

The present invention relates generally to applications of Raman spectroscopy, and more particularly to methods and systems for identification of bacteria in a biological fluid using Raman spectroscopy and applications of the same.

BACKGROUND OF THE INVENTION

1. Technical Field

The invention relates to the field of edge computing, and more particularly relates to an implementation method of unstructured data sharing mechanism for edge computing and the system thereof.

2. Background Art

Edge Computing has been proposed to transfer computing and storage capacity from remote clouds to the edge of the network near mobile devices, sensors and end users. At the same time, it is expected to dramatically reduce network latency and traffic and to solve the key problems of implementing 5G communications. In edge computing, edge servers, which is also known as nodes, can perform computational offloading, data storage, data caching and data processing for edge users. However, unlike cloud data center servers, edge servers are typically geographically distributed with heterogeneous computing and storage capacity. In edge computing, when an edge user sends a data request, the request first sends to the nearest edge server. If the edge server caches the data, it will return the data to the edge user; otherwise, it will retrieve the data from the edge user's cloud. However, retrieving data from the cloud generates a lot of backhaul traffic and long delays. In addition, retrieving data from those neighboring edge servers that cache the required data can effectively reduce bandwidth consumption and delay in request response. Edge computing is expected to dramatically reduce network latency and traffic, with many edge servers at the edge of the Internet. In addition, these edge servers cache data to serve edge users. Data sharing between edge servers can effectively reduce the latency of retrieving data and further reduce network bandwidth consumption. The key challenge is to build an efficient data indexing mechanism that enables efficient retrieval of data no matter how it is cached in the edge network. Although this is indispensable, it is still an urgent problem to be solved. Therefore, there is an urgent need to study data sharing between edge servers.

To achieve data sharing, a key challenge is to implement a data index that indicates the location of the data in the edge computing environment. However, it is still an open issue to be solved. An effective data indexing mechanism is necessary in this case. Some early work on data indexing in other computing environments falls into three categories. Referring to FIG. 2, FIG. 2(a) is a full index where each edge node maintains a complete index of all data in the edge network. At the top of the full indexing mechanism, each edge node can quickly react if there are data items in the edge network. However, the disadvantage of full indexing is that the bandwidth cost of maintaining a full index is too high. When an edge node caches a new data item, it needs to publish the data location to all edge nodes in the edge network. FIG. 2(b) is a centralized index, wherein the dedicated index server stores all data indexes and each edge node forwards the data request to the unique index server. In short, only dedicated index edge servers need to store the full DIT. However, one obvious drawback of this design is that the centralized index server gets performance bottleneck. To make matter worse, it has worse fault tolerance and load balancing. The last one in FIG. 2(c) is the Distributed Hash Table (DHT) index, which has been extensively studied in peer-to-peer (P2P) networks and can be a candidate for data sharing in edge computing. The DHT index is a distributed indexing mechanism and each index edge server only stores part of the DIT. However, the DHT indexing mechanism uses multiple overlay hops to retrieve the data index, where each overlay hop refers to the shortest path between the two edge servers. Specifically, for any query, the search process typically involves log(n) forwarding, where n is the number of edge nodes in the edge network. The ingress edge server can forward each incoming packet to a series of intermediate indirect edge servers before reaching the final index edge server, as shown in FIG. 2(c). Undoubtedly, longer paths increase query processing latency, server load and consume more internal link capacity in the edge network.

Therefore, a heretofore unaddressed need exists in the art to address the aforementioned deficiencies and inadequacies.

SUMMARY OF THE INVENTION

The purpose of the invention is to provide an implementation method of unstructured data sharing mechanism for edge computing in order to reduce the bandwidth consumption and high cost of data indexing.

The invention is a coordinate-based indexing (COIN) mechanism that requires only one overlay hop to search the data index, as shown in FIG. 2(d). In addition, it implements the advantages of distributed data indexing and requires fewer forwarding entries on each switch to support data indexing than DHT indexing mechanisms.

The COIN mechanism of the invention takes full advantage of the software defined network (SDN), in which the control plane can collect network topology and status, including switch, port, link and moderator information. When applying the principles of SDN to edge computing, the network is referred to as Software Defined Edge Network (SDEN). In SDN, network management is logically concentrated in a control plane consisting of one or more controllers that generate forwarding table entries for the switch. The switches in the switch plane only forward packets based on the installation entries that are derived from the controller.

The invention provides an implementation method of unstructured data sharing mechanism for edge computing, includes the following steps:

S1: receive a data index request from a user, collect the switch, port, link and host information through the control plane to obtain the network topology and status;

S2: determine the coordinates of the switch and the coordinates of the data index in the virtual space formed by the network topology;

S3: construct a switch connection diagram according to the coordinates of the switch;

S4: insert the coordinates of the switch and forwarding entries of the switch connection diagram in the forwarding table of the switch;

S5: the data plane greedily forwards the coordinates of the data index until being transmitted to the switch corresponding to the switch coordinates closest to the coordinates of the data index in the virtual space;

S6: the switch forwards the data index of the user to the index edge server and returns the response result obtained from the index edge server to the user.

Optionally, the method of determining the coordinates of the switch is obtained by constructing the shortest path matrix and using the multidimensional scaling (MDS algorithm).

Optionally, the method of determining the coordinates of the switch includes the following steps:

S201: compute the squared distance matrix $L^{(2)}=[l_{ij}^2]$;

S202: construct the scalar product matrix by multiplying the squared distance matrix $L^{(2)}$ with the matrix $$J = I - \frac{1}{n}A;$$

that is $B=\frac{1}{2}JL^{(2)}J$, where n is the number of switches, A is the squared matrix with all elements are 1;

S203: determine the m largest eigenvalues and corresponding eigenvectors of the matrix B, where m is the number of dimensions;

S204: compute the coordinates of the switches $U=Q_m \Lambda^{1/2}_m$, where $Q_m$ is the matrix of m eigenvectors and $\Lambda^{1/2}_m$ is the diagonal matrix of m eigenvalues of the matrix B, respectively.

Optionally, the method of determining the coordinates of the switch is implemented through constructing the shortest path matrix, while the method of determining the coordinates of the data index is determined by using the hash function SHA-256 algorithm.

Optionally, the switch connection diagram constructed based on the coordinates of the switch is a Delaunay triangulation (DT) diagram constructed by using the random increment algorithm.

Optionally, the criterion for the greedy forwarding is that the switch in which the data index packet is located forwards the data index packet to the neighbor switch closest to the coordinate of the data index, including physical neighbor and DT neighbor.

Optionally, the switch uses the virtual coordinates of its physical and DT neighbors and the coordinate p=H(d) of the data index to compute estimated distances; for each physical neighbor v, switch u computes the estimated distance Rv=Dis(v,d), wherein d indicates the coordinate position of the data index to be queried in the virtual space, Rv is the Euclidean distance from v to d in the virtual space; for every DT neighbor $\tilde{v}$, switch u computes the estimated distance from $\tilde{v}$ to d by $R_{\tilde{v}}$=Dis($\tilde{v}$,d); switch u selects the neighbor switch $R_{v*}$ that makes $R_{v*}$=min $\{R_v,R_{\tilde{v}}\}$; when $R_{v*}$<Dis(u, d), if v* is physical neighbor, switch u sends the packet to v* directly; if v* is DT neighbor, u sends the virtual link to v*; if $R_{v*}$<Dis(u, d) is not satisfied, switch u is closest to the coordinate of the data index, then switch u forwards the data index to its indexing edge server directly.

Optionally, when the switch receives a packet being forwarded in the virtual link, the packet is processed as follows:

when switch u has received a data index d to forward, switch u stores it with the format: d=<d.des; d.src; d.relay; d.index> in a local data structure, where d.des is the DT neighboring switch of the source switch d.src, d.delay is the relay switch and d.index is the payload of the data index; when d.relay≠null, the data index d is traversing a virtual link.

Optionally, the method of the switch processing the packet is as follows:

when u=d.des is found to be true, switch u is the DT neighboring switch, which is the endpoint of the virtual link; switch u will continue to forward the data index d to its neighbor, which is closest to the coordinate of the data index in the virtual space;

when u=d.succ, switch u first finds tuple t from the forwarding table, wherein t.des=d.des; switch u revises d.relay=t.succ based on the matched tuple t, wherein d.succ is the successor switch in the forwarding path, t.des is one attribute in a flow table entry in the forwarding table as well as the identifier of the destination switch to which it is forwarded;

switch u is to transmit the data index to d.relay.

In accordance with the above-mentioned method, the present invention also provides an implementation system of an unstructured data sharing mechanism for edge computing, including: a memory, a processor, and a computer program stored in the memory and executable on the processor. The steps of any of the methods described above are executed when the computer program is executed by the processor.

The advantageous effects of the invention include:

The invention proposes a coordinate-based indexing mechanism for unstructured data sharing in an edge computing environment. The indexing mechanism performs data forwarding according to coordinates, as a result, the path length is shorter, while the forwarding table entries required in the switch for searching data index are required less.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION OF THE PREFERRED EMBODIMENTS

The following terms are used in the embodiments to describe the data sharing framework:

1) The ingress edge server refers to the nearest edge server as a base station (BS). All data requests from the BS are first provided to the edge server.

2) Storage Edge Server refers to an edge server that stores some shared data items.

3) The index edge server refers to an edge server that stores an index of cache data at the storage edge server. Note that each edge node identifies an edge server as an index edge server.

4) The indirect edge server refers to the intermediate edge server, which forwards any query request for the data index, excluding the ingress edge server and the index edge server.

The First Embodiment

Figure 1:
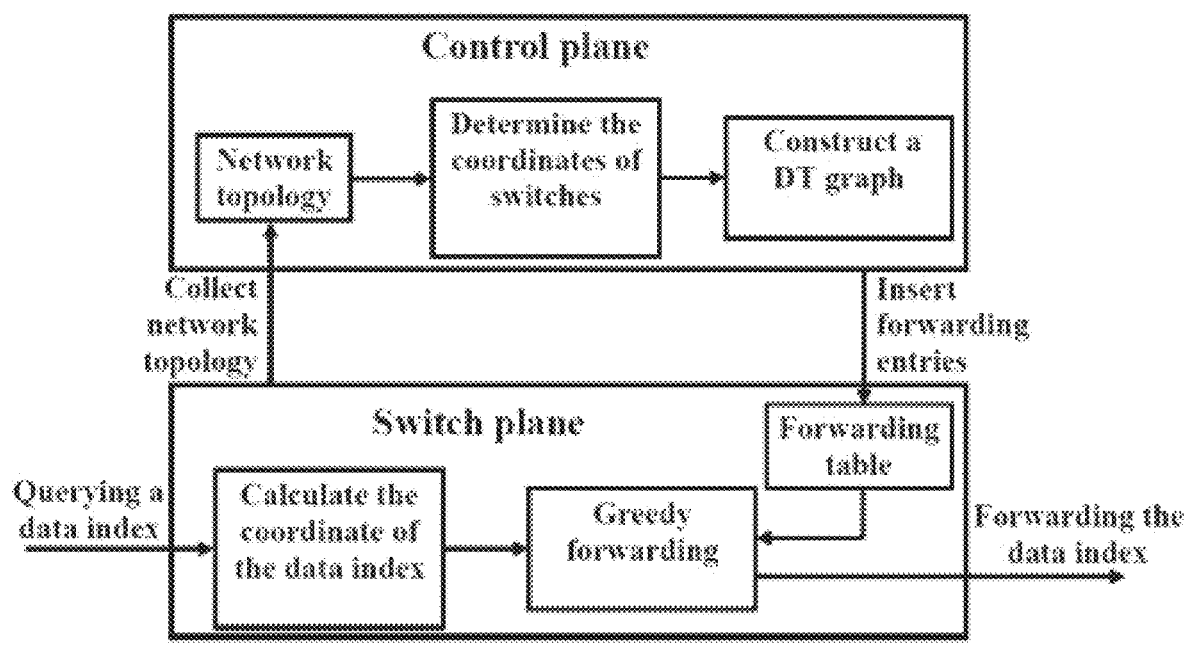
FIG. 1 is a COIN mechanism framework and a data flow diagram in an edge software defined by the software of the invention.
Figure 2:
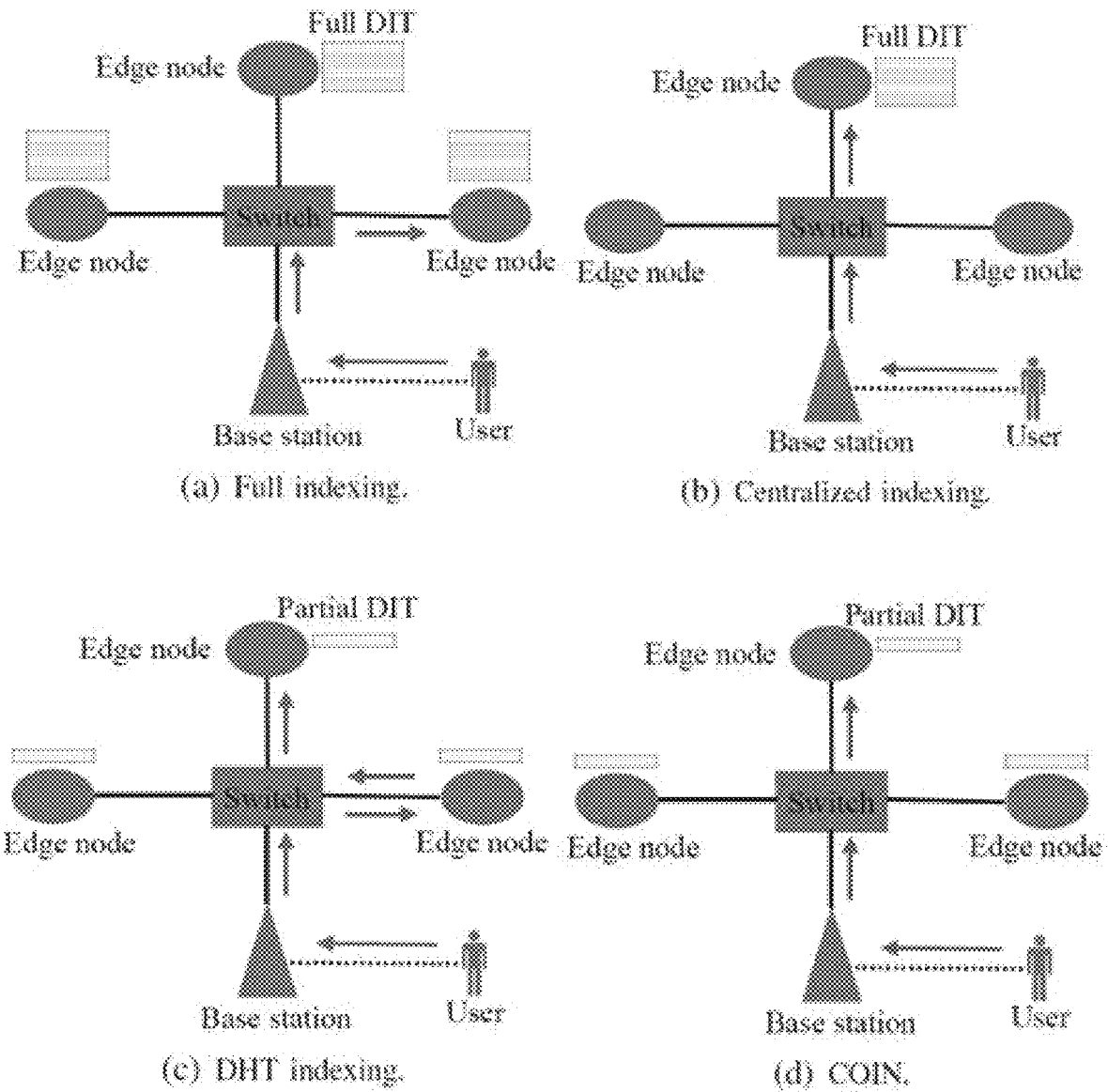
FIG. 2 is a schematic diagram of packet forwarding under different data indexing mechanisms.
Figure 6:
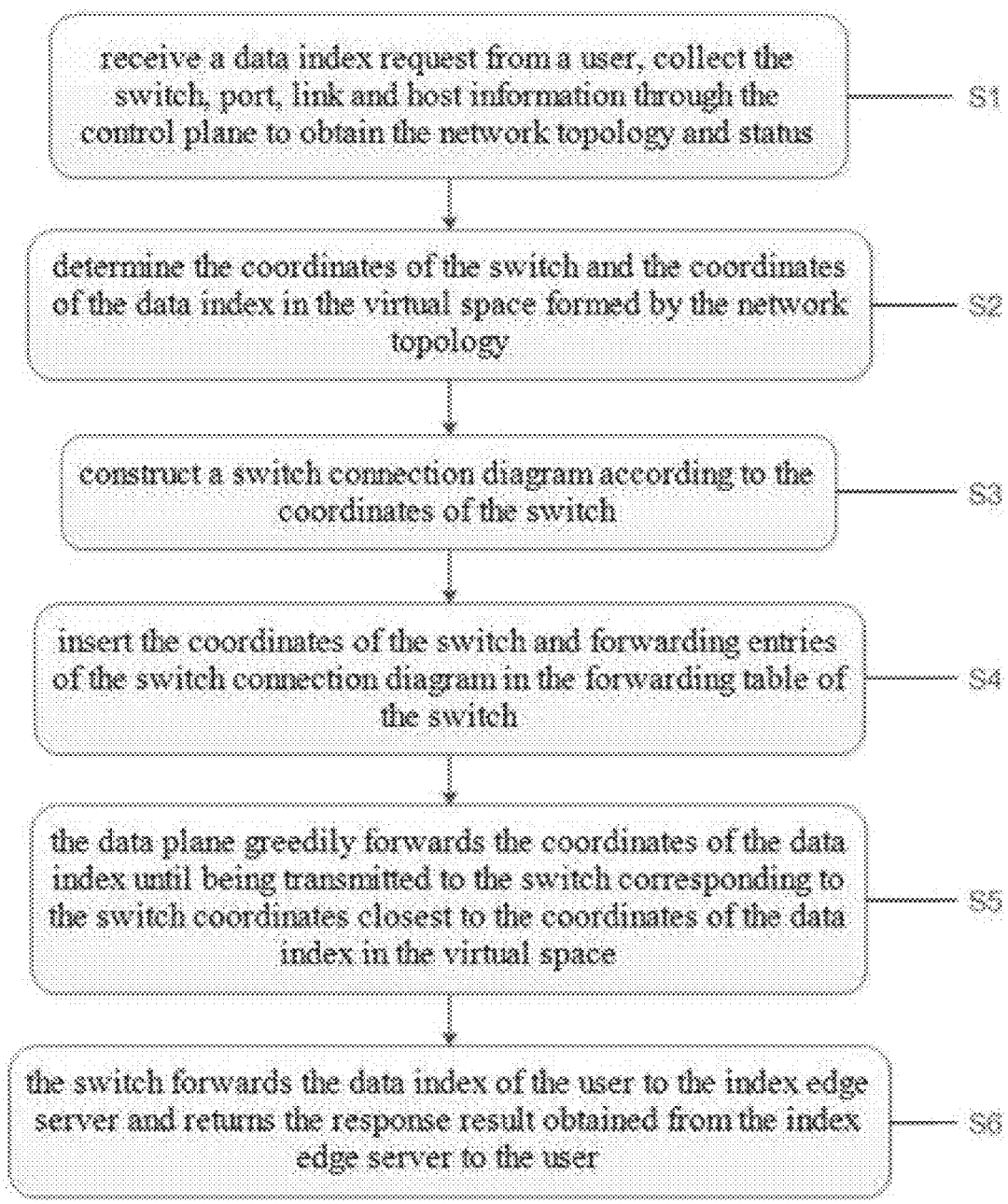
FIG. 6 is a flow chart of an implementation method of unstructured data sharing mechanism for edge computing according to the invention.

The embodiment provides an implementation method of unstructured data sharing mechanism for edge computing, as shown in FIG. 1 and FIG. 6, comprises the following steps:

S1: receive a data index request from a user, collect the switch, port, link and host information through the control plane to obtain the network topology and status.

The SDN includes a control plane and a switch plane. The control plane can collect network topology and status, including switch, port, link and moderator information. In SDN, network management is logically concentrated in a control plane consisting of one or more controllers that generate forwarding table entries for the switch. The switches in the switch plane only forward packets based on the installation entries that are derived from the controller.

The embodiment first obtains the network topology and state through the control plane collecting switch, port, link and host information, in order to provide a basis for the subsequent determination of the switch coordinates and the data index coordinates.

S2: determine the coordinates of the switch and the coordinates of the data index in the virtual space formed by the network topology.

The shortest path matrix between switches can be first calculated by the control plane. However, the key challenge is how to calculate the coordinate matrix of n points where the shortest path lengths between n switches can be indirectly reflected by the distances between points in the virtual space. In other words, we need to solve the problem of finding a point configuration that represents a given scalar-product matrix. In matrix notation, this amounts to solving the equation:

$$B = XX' \quad (1)$$

where X is the n×m coordinate matrix of n points in m-dimensional space.

Every n×n matrix B of real numbers can be decomposed into a product of several matrices. The eigen decomposition can be constructed for most matrices, but always for symmetric ones. Formally, $$B = Q\Lambda Q' \quad (2)$$

where Q is orthonormal (i.e., $QQ'=Q'Q=I$) and $\Lambda$ is diagonal.

Every n×m matrix X can be decomposed into:

$$X = P\Phi Q' \quad (3)$$

where P is an n×m orthogonal matrix, (i.e. $P'P=I$), $\Phi$ is an m×m diagonal matrix, Q is an m×m orthogonal matrix (i.e. $Q'Q=I$).

Assume that we know the decompositions of X as given in Formula (3). Then, $$XX' = P\Phi Q'Q\Phi P' = P\Phi\Phi P' = P\Phi^2 P' \quad (4)$$

which is just the eigen decomposition of XX' based on Equation (2). This proves that the eigenvalues of XX' are all nonnegative because they consist of $\Phi^2_i$ and squared numbers are always nonnegative.

Furthermore, suppose that we do an eigen decomposition of $B=Q\Lambda Q'$. We know that scalar product matrices are symmetric and have nonnegative eigenvalues based on Equations (2) and (4). Therefore, we may write $B=(Q\Lambda^{1/2})(Q\Lambda^{1/2})'=UU'$, where $\Lambda^{1/2}$ is a diagonal matrix with diagonal elements $\lambda_i^{1/2}$. Thus, $U=Q\Lambda^{1/2}$ gives coordinates that reconstruct B. The coordinates in U may differ from those of X in Equation (1). This simply means that they are expressed relative to two different coordinate systems, which can be rotated into each other.

The method of determining the coordinates of the switch can be determined by the following algorithm: using the classic MDS algorithm to calculate the coordinates of the switch in the virtual space.

Require: The shortest path matrix L.

Ensure: The coordinates of the switches U.

S201: compute the squared distance matrix $L^{(2)}=[l_{ij}^2]$;

S202: construct the scalar product matrix R by multiplying the squared distance matrix $L^{(2)}$ with the matrix $$J = I - \frac{1}{n}A;$$

that is $B=-\frac{1}{2}JL^{(2)}J$, where n is the number of switches, A is the squared matrix with all elements are 1;

S203: determine the m largest eigenvalues and corresponding eigenvectors of the matrix B, where m is the number of dimensions;

S204: compute the coordinates of the switches $U=Q_m \Lambda^{1/2}_m$, where $Q_m$ is the matrix of m eigenvectors and $\Lambda^{1/2}_m$ is the diagonal matrix of m eigenvalues of the matrix B, respectively.

Based on the above analysis, we design the embedding algorithm of path lengths to calculate the coordinates of switches in the virtual space as shown in the Algorithm above, which can preserve the network distances between switches as well as possible. First, the aforementioned Algorithm takes an input matrix giving network distances between pairs of switches, which is known to the control plane of the network. Then, the aforementioned Algorithm utilizes the fact that the coordinate matrix can be derived by eigenvalue decomposition from B=UU' where the scalar product matrix B can be computed from the distance matrix L by using the double centering in S202 of the Algorithm above. Last, the coordinates of the switches U in the virtual space are obtained by multiplying eigenvalues and eigenvectors in S204 of the Algorithm above. Based on the aforementioned Algorithm, the coordinates of switches in the virtual space can be determined.

The coordinate of a data index is achieved by the hash value H(d) of the identifier of the data index d. In this embodiment, we adopt the hash function, SHA-256, which outputs a 32-byte binary value. Note that other hash functions can also be used. Meanwhile, in the case of a hash collision, it means that two or more data indexes are assigned to the same coordinate and stored in the same indexing edge server. Furthermore, the hash value H(d) is reduced to the scope of the 2D virtual space. We only use the last 8 bytes of H(d) and convert them to two 4-byte binary numbers, x and y. We limit that the coordinate value ranges from 0 to 1 in each dimension. Then, the coordinate of a data index in 2D is a two-tuple $$\left(\frac{x}{2^{32}-1}, \frac{y}{2^{32}-1}\right).$$

The coordinate can be stored in decimal format, using 4 bytes per dimension. Hereafter, for any data identifier d, we use H(d) to represent its coordinate.

S3: construct a switch connection diagram according to the coordinates of the switch.

Under the COIN mechanism, each switch greedily forwards a data index to its neighbor, whose coordinate is closest to the coordinate of the data index. Recall that greedy routing on a DT graph provides the property of guaranteed delivery, which is based on a rigorous theoretical foundation. Therefore, to achieve the guaranteed delivery, the control plane first constructs a DT graph, which connects all switches' coordinates in the virtual space.

Given a set of switches and their coordinates in a set of points P, we adopt the randomized incremental algorithm to construct the DT DT(P) in the 2D virtual space. After constructing a DT, note that a DT neighbor of a switch may not be its physical neighbor. Therefore, to achieve the guaranteed delivery, each switch maintains two kinds of forwarding entries. The first one makes it forward packets to its physical neighbors, while the other one makes it forward requests to its DT neighbors. The switches that are not directly connected to an indexing edge server would not participate in the construction of the DT. Those switches are just used as the intermediate switches to transfer data indexes to the DT neighbors.

S4: insert the coordinates of the switch and forwarding entries of the switch connection diagram in the forwarding table of the switch.

The control plane inserts forwarding entries into the forwarding table of the switch, where each forwarding entry indicates the coordinates of the neighboring switch. More specifically, the identifier of each index of shared data is assigned to the coordinates in the virtual space.

S5: the data plane greedily forwards the coordinates of the data index until being transmitted to the switch corresponding to the switch coordinates closest to the coordinates of the data index in the virtual space.

The criterion for the greedy forwarding is that the switch in which the data index packet is located forwards the data index packet to the neighbor switch closest to the coordinate of the data index, including physical neighbor and DT neighbor.

The switch uses the virtual coordinates of its physical and DT neighbors and the coordinate p=H(d) of the data index to compute estimated distances; for each physical neighbor v, switch u computes the estimated distance Rv=Dis(v,d), wherein d indicates the coordinate position of the data index to be queried in the virtual space, Rv is the Euclidean distance from v to d in the virtual space; for every DT neighbor $\tilde{v}$, switch u computes the estimated distance from $\tilde{v}$ to d by $R_{\tilde{v}}$=Dis($\tilde{v}$,d); switch u selects the neighbor switch $R_{v*}$ that makes $R_{v*}$=min $\{R_v, R_{\tilde{v}}\}$; when $R_{v*}$<Dis(u, d), if v* is physical neighbor, switch u sends the packet to v* directly; if v* is DT neighbor, u sends the virtual link to v*; if $R_{v*}$<Dis(u, d) is not satisfied, switch u is closest to the coordinate of the data index, then switch u forwards the data index to its indexing edge server directly.

When the switch receives a packet being forwarded in the virtual link, the packet is processed as follows:

when switch u has received a data index d to forward, switch u stores it with the format: d=<d.des; d.src; d.relay; d.index> in a local data structure, where d.des is the DT neighboring switch of the source switch d.src, d.delay is the relay switch and d.index is the payload of the data index; when d.relay≠null, the data index d is traversing a virtual link.

When u=d.des is found to be true, switch u is the DT neighboring switch, which is the endpoint of the virtual link; switch u will continue to forward the data index d to its neighbor, which is closest to the coordinate of the data index in the virtual space;

when u=d.succ, switch u first finds tuple t from the forwarding table, wherein t.des=d.des; switch u revises d.relay=t.succ based on the matched tuple t, wherein d.succ is the successor switch in the forwarding path, t.des is one attribute in a flow table entry in the forwarding table as well as the identifier of the destination switch to which it is forwarded;

switch u is to transmit the data index to d.relay.

S6: the switch forwards the data index of the user to the index edge server and returns the response result obtained from the index edge server to the user.

Under the COIN mechanism, the query data index is similar to the publishing process. The query process is also an identifier that uses the data index and each switch greedily forwards the query request to the switch whose coordinates are closest to the data index coordinates in the virtual space. That is to say, the switch uses the same method to determine the index edge server, which will respond to the query request. The index edge server then returns a data index indicating the location of the data in the edge network. Finally, the data requester can use the shortest path routing or other routing scheme to retrieve the data, which is orthogonal to this work.

Comparison of different indexing mechanisms can be shown as below:

| Indexing mechanism | Lookup speed | Memory Scalability | Request load balancing | Bandwidth cost |
|---|---|---|---|---|
| COIN | Median | Good | Good | Low |
| DHT indexing | Slow | Good | Good | Median |
| Centralized indexing | Median | Bad | Bad | Low |
| Full indexing | Fast | Bad | Good | High |

In accordance with the above-mentioned method, the present invention also provides an edge computing-oriented unstructured data sharing mechanism implementation system, including: a memory, a processor, and a computer program stored in the memory and executable on the processor. The steps of any of the methods described above are executed when the computer program is executed.

Figure 8:
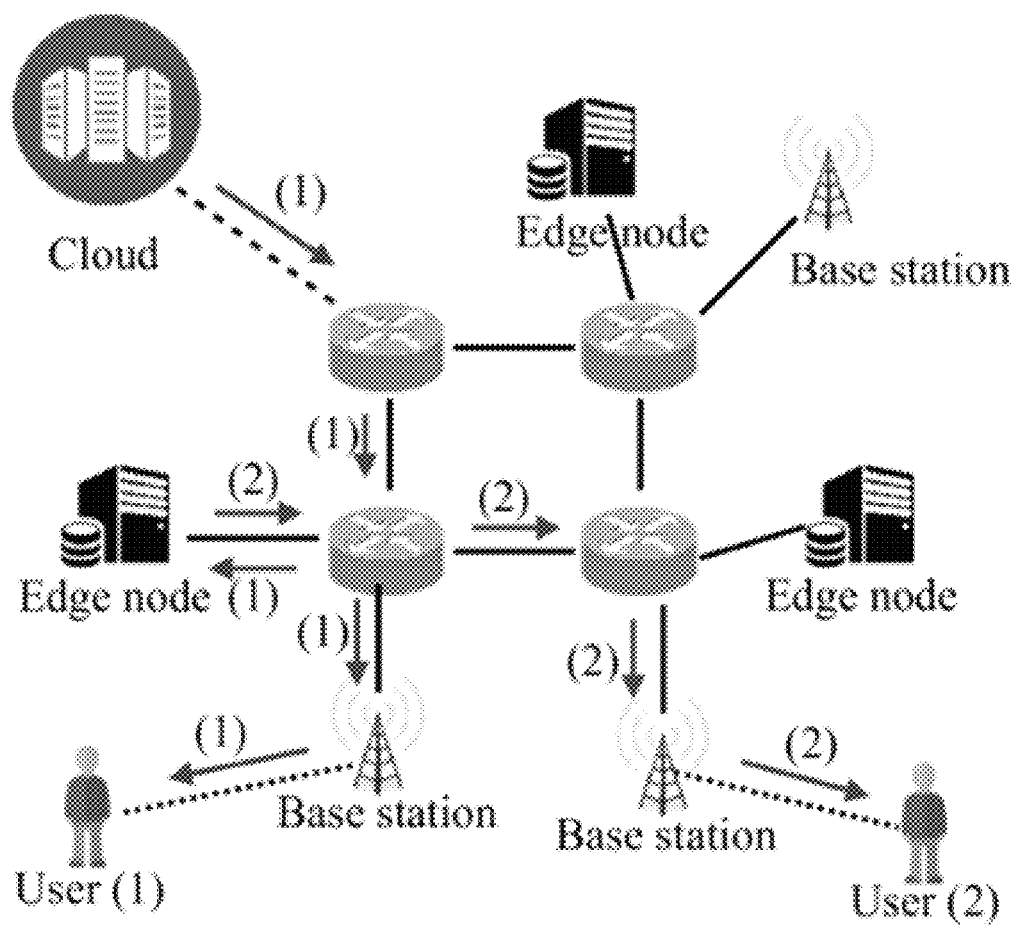
FIG. 8 is a schematic diagram of a system for implementing an unstructured data sharing mechanism for edge computing.

Referring to FIG. 8, a computer program that implements the steps of any of the foregoing methods is stored in a memory of a base station, an edge node, and a cloud, and is executed by a processor of the base station, the edge node, and the cloud.

The Second Embodiment

It is about the optimized design when the COIN mechanism is used for multiple data copies and multiple index copies.

A scheme for multiple copies of data:

When the data retrieved from other edge servers does not meet the low latency requirements in the edge computing environment, the ingress edge server will also cache the data copies. At the same time, requesting some popular content can be focused on. In this case, for load balancing, multiple copies of the data will be cached in the edge network. To enable multiple copies of data, the data structure <Key, Vector> is used to store the data index, where the Vector has multiple elements, each of which indicates the location of the data copy. When the ingress edge server caches the data copy again, it publishes the data index to its index edge server. The index edge server then finds the corresponding Key and adds the new element to the corresponding Vector. The key challenge is how to take advantage of multiple copies of data to provide better service to edge users. That is, each ingress edge server wishes to retrieve a copy of the data stored in the storage edge server closest to the ingress edge server.

However, the path length of each data copy is unknown. A straightforward approach is to send probe packets to all copies of the data, but it will result in longer delays and more bandwidth consumption. We have embedded the distance between the switches into the virtual space. The path length between the two edge servers can be estimated by calculating the distance between two respective switches directly connected to the two edge servers. To achieve this advantage, the data location is indicated by the address of the storage edge server and the coordinates of the switch directly connected to the storage edge server. Then, when the ingress edge server retrieves the data index of the format <Key, Vector>, it contains the location of multiple copies of the data. The ingress edge server can immediately select the storage edge server to retrieve the data with the shortest path by adjusting the distance between the corresponding switches in the virtual space.

A scheme for multi-index copy:

At current, we only consider one data index for each shared data. However, for the fault tolerance or the load balance, the edge network could store multiple data indexes for each shared data. That is, the data indexes of a shared data can be stored in multiple different indexing edge servers. To enable this, we further optimize the COIN mechanism under multiple index copies. We have described that the indexing edge server for a data index is determined by the hash value H(d) of the data index where d is the identifier of the data index. Now, to enable multiple index copies, the indexing edge server for the $i^{th}$ index copy is determined by the hash value H (d+i−1). Note that the data identifier is a string. The serial number i of the index copy is converted to a character, then the string of the data identifier and the character are concatenated. Last, the hash value of the new string uniquely determines the indexing edge server that will store the index copy. Furthermore, when there are a index copies, the indexing edge server that stores the $\alpha^{th}$ index copy is uniquely determined by the hash value H (d+α−1).

The key challenge is how to quickly obtain the optimal index copy that is closest to the ingress edge server when multiple index copies are available. It means that the path of retrieving the index is the shortest. However, achieving this goal is hard, that is because we just know the identifier of the data index and we do not require the ingress edge server to store other more information. Recall that the coordinate of the data index is calculated based on the hash value of each index copy. Then, the data index is forwarded to the switch whose coordinate is closest to the coordinate of the data index in the virtual space, while the indexing edge server directly connected to the switch will store the data index. In this case, to select the optimal index copy without probing all index copies, the key enabler is to reflect the path length between two switches by the distance between the corresponding points in the virtual space. After that, the switch can forward the querying request of a data index to the nearest index copy based on the coordinates of the switch and the index copies. Therefore, under the COIN mechanism, the ingress edge server can quickly select the index copy that achieves the shortest path length to retrieve the data index.

The Third Embodiment

This embodiment implements and evaluates the COIN mechanism constructed in embodiment 1 on a small test platform. In addition, the effectiveness and efficiency of the COIN mechanism is assessed through large-scale simulations.

A. Implementation and Prototype-Based Experiments

Figure 4:
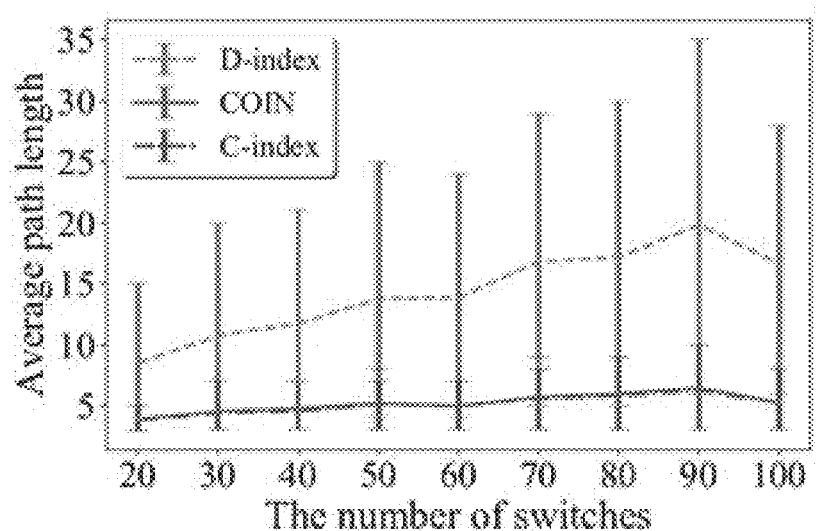
FIG. 4 is a comparison diagram of average path lengths of retrieving data indexes under different indexing mechanisms in a preferred embodiment of the invention.
Figure 4:
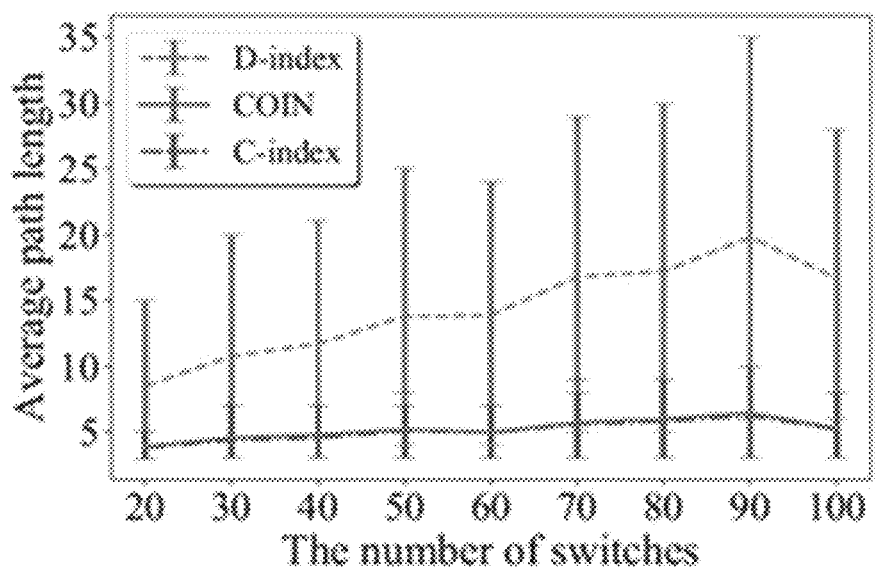
Figure 7:
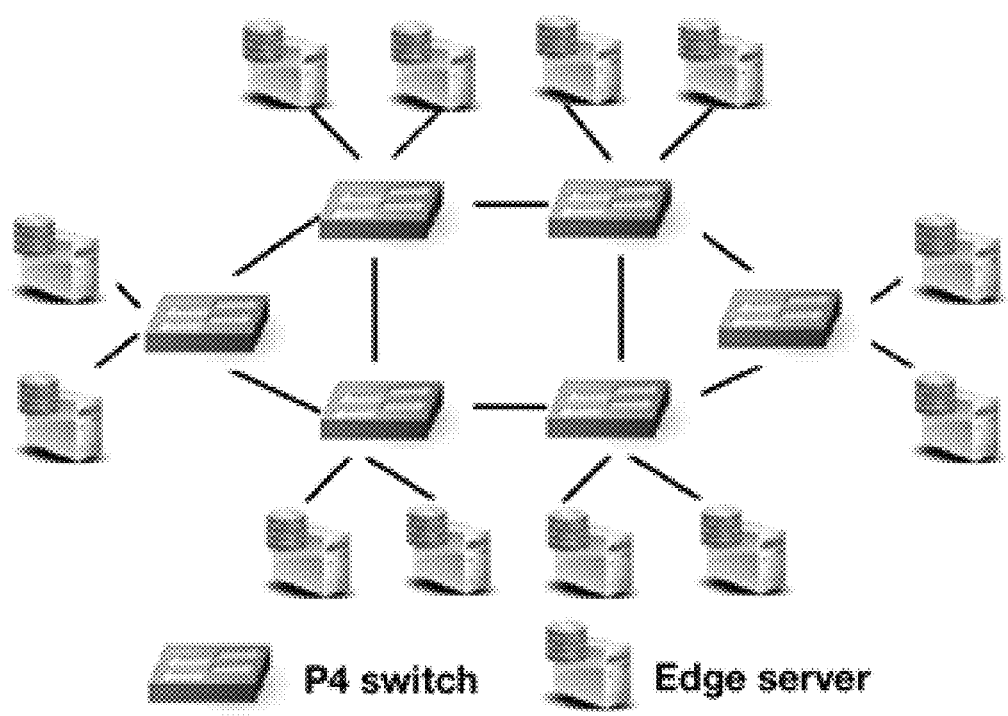
FIG. 7 is a schematic structural diagram of a test platform according to a preferred embodiment of the present invention.

We have built a testbed, as shown in FIG. 7, which consists of 6 P4 switches and 12 edge servers as shown in FIG. 4. We implement the centralized indexing (C-index), the DHT indexing (D-index) and our COIN mechanisms on our testbed and further compare the performances of the three different indexing mechanisms. We implement the COIN mechanism, including all switch plane and control plane features described in embodiment 1, where the switch plane is written in P4 and the function in the control plane is written in Java. The P4 compiler generates Thrift APIs for the controller to insert the forwarding entries into the switches. The P4 switch supports a programmable parser to allow new headers to be defined where multiple match+action stages are designed in series to achieve the neighboring switch whose coordinate is closest to the coordinate of the data index. The P4 switch calculates the distance from a neighboring switch to the data index in the virtual space in a match+action stage.

Figure 3:
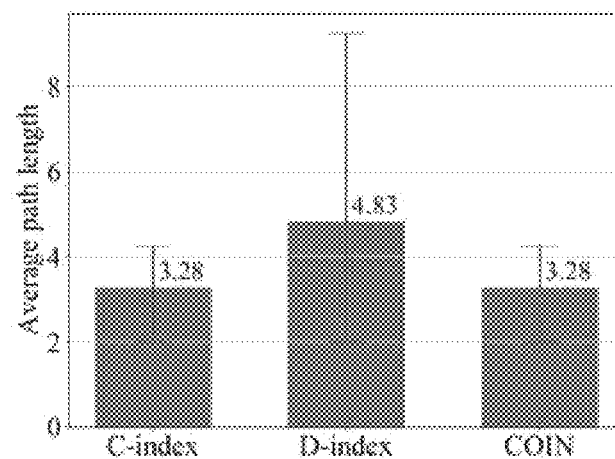
FIG. 3 is a comparison diagram of path lengths and forwarding entries under different indexing mechanisms in a small-scale test bed according to a preferred embodiment of the invention.
Figure 3:
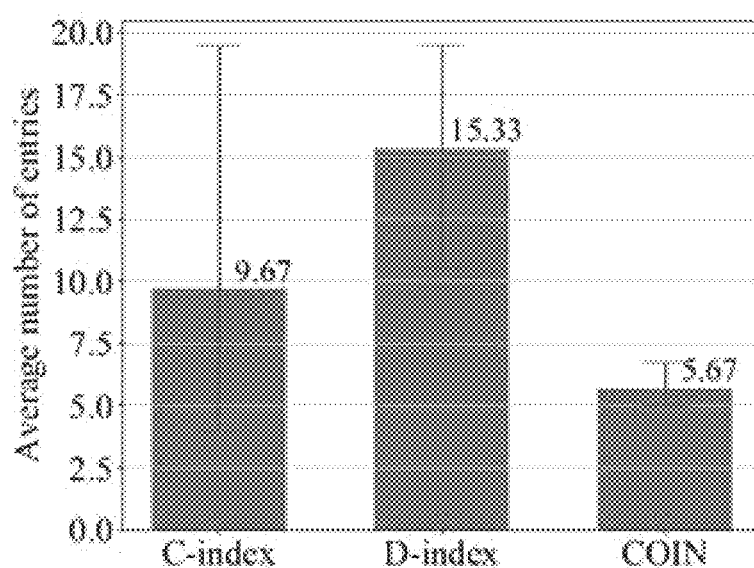

We first compare the path lengths and the number of forwarding table entries under different indexing mechanisms. The path lengths from all edge servers to the indexing edge server are calculated, then the average path lengths under different indexing mechanisms are obtained. As shown in FIG. 3, the average path length achieved by our COIN mechanism is close to the average path length achieved by the C-index mechanism and is obviously shorter than the average path length achieved by the D-index mechanism. Note that the C-index mechanism uses the shortest path between an ingress edge server and the indexing edge server to retrieve a data index. The D-index mechanism retrieves a data index while employing multiple overlay hops where one overlay hop is related to the shortest path between two edge servers. However, our COIN mechanism only employs one overlay hop to retrieve the data index.

Furthermore, we compare the number of forwarding table entries for the data indexing under different indexing mechanisms where the C-index and D-index mechanisms forward the packets by matching the source and destination addresses. As shown in FIG. 3(b), our COIN mechanism achieves fewer forwarding table entries in switches than the other two indexing mechanisms. It is because that under our COIN mechanism, the number of forwarding table entries in each switch is just related to the number of its neighboring switches. However, under the C-index and D-index mechanisms, the number of forwarding table entries increases as the increase of the number of flows in the edge network.

B. Setting of Large-Scale Simulations

In simulations, we use BRITE with the Waxman model to generate synthetic topologies at the switch level where each switch connects to 10 edge servers. We vary the number of switches from 20 to 100. Note that our COIN mechanism can be scaled to larger networks and these networks are the same size as the software-defined network. Meanwhile, it is worth noting that the advantage of the COIN mechanism will be more obvious when the network size increases. We compare the centralized indexing (C-index), the DHT indexing (D-index) with our COIN mechanism. We adopt two performance metrics to evaluate different indexing mechanisms including the path lengths and the number of forwarding table entries for retrieving data indexes. Each error bar is constructed using a 95% confidence interval of the mean. Meanwhile, we evaluate the impact of multiple index copies on the path lengths of retrieving data indexes.

C. The Path Lengths for Retrieving Data Indexes

We evaluate the path lengths for retrieving data indexes under different indexing mechanisms. The path lengths from all edge servers to the indexing edge server are calculated, then the average path length is obtained.

FIG. 4(a) shows that the average path length of retrieving data indexes are almost the same for COIN and C-index mechanisms. Note that C-index mechanism uses the shortest path from an ingress edge server to the dedicated indexing server to retrieve the data index. Meanwhile, we can see that COIN and C-index mechanisms achieve significantly shorter path lengths than the D-index mechanism from FIG. 4(a). The average path length under the D-index mechanism has an obvious increase as the increase in the number of switches in FIG. 4(a). However, the increase is slow for COIN and C-index mechanisms when the number of switches changes.

Note that the results are achieved in FIG. 4(a) where only one index copy is maintained for each shared data. Furthermore, we evaluate the change of the average path length when there are three index copies for each shared data. In this case, we test the path length for each index copy, and the path length of the shortest path is recorded for each indexing mechanism under each network setting. The experiment results are shown in FIG. 4(b), which shows almost the same trend as FIG. 4(a). That is to say, the average path length for retrieving data indexes under COIN mechanism is close to the average path length achieved by C-index mechanism and is obviously shorter than the average path length under D-index mechanism. It is worth noting that C-index mechanism is a centralized indexing mechanism and suffers from the performance drawbacks in the fault tolerance and the scalability.

D. Forwarding Entries for Retrieving Data Indexes

In this section, we evaluate the number of forwarding table entries for searching data indexes under different indexing mechanisms. For C-index and D-index mechanisms, we use the wildcard forwarding entries to significantly reduce the number of forwarding table entries.

Figure 5:
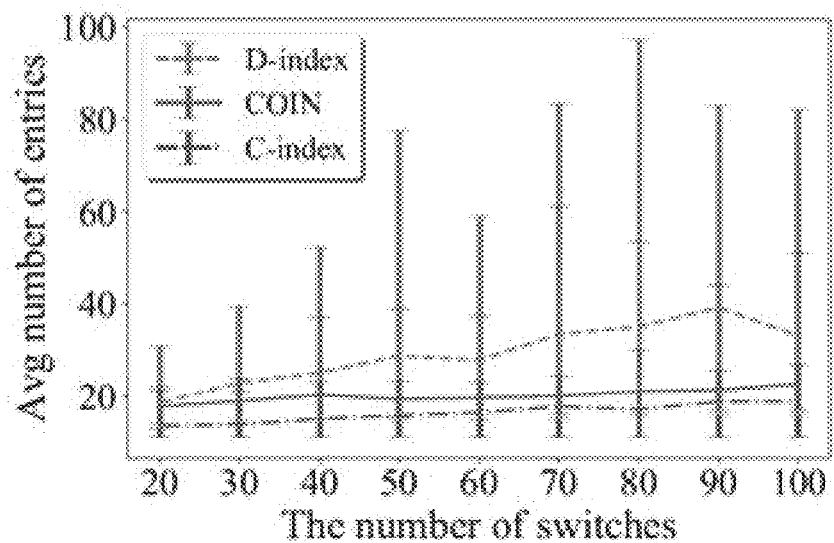
FIG. 5 is a comparison diagram of the number of forwarding table entries under different indexing mechanisms in a preferred embodiment of the invention.
Figure 5:
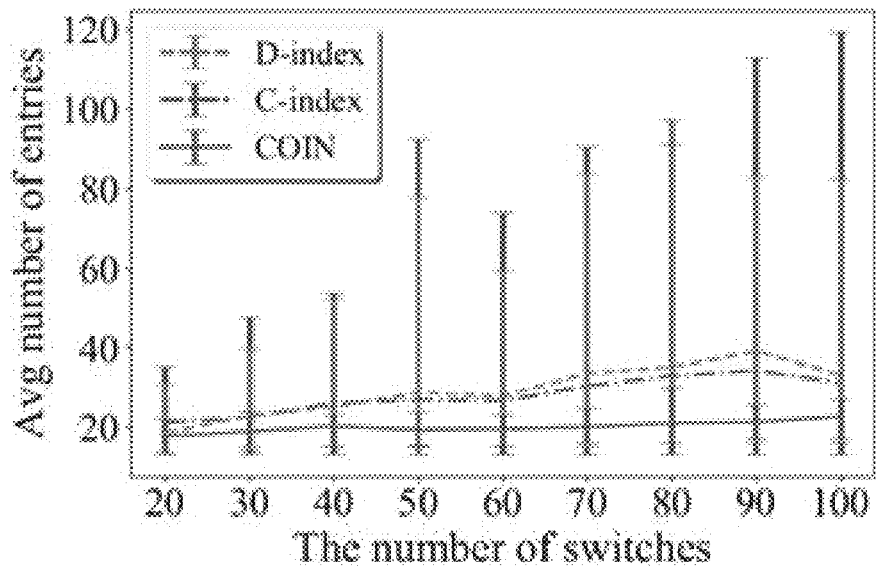

FIG. 5(a) shows the change trend of the number of forwarding table entries as the increase of the number of switches under different indexing mechanisms. Each point in FIG. 5(a) indicates the average number of forwarding table entries over all switches under each network setting. We can see that, for C-index and D-index mechanisms, the average number of forwarding table entries increases as the increase in the number of switches from FIG. 5(a). However, the average number forwarding table entries of our COIN mechanism is almost independent of the network size since it is only related to the number of neighboring switches for each switch. Meanwhile, we can see that the upper error bars for the C-index mechanism are significantly higher than our COIN mechanism from FIG. 5(a). It is because that the C-index mechanism employs the shortest path routing where some switches are frequently used in most of shortest paths, then a large amount of forwarding table entries are inserted into those switches.

The result of FIG. 5(a) is achieved when there is only one index copy for each shared data. Furthermore, FIG. 5(b) shows the average number of forwarding table entries for different indexing mechanisms when three index copies are stored for each shared data. In this scenario, we can see that the average number of forwarding entries for our COIN mechanism is the least among the three indexing mechanisms. Note that the average number of forwarding entries decreases when the number of switches varies from 90 to 100. The reason is that the network topologies are generated independently under different network sizes. We can see that, for the C-index mechanism, the increase of the number of index copies causes the increase in the number of forwarding table entries from FIG. 5(c). However, more index copies have no impact on the number of forwarding table entries for D-index and COIN mechanisms. Furthermore, our COIN mechanism uses 30% less forwarding table entries compared to the well-known distributed D-index mechanism.

The above description is aimed to show the preferred embodiment of the invention and is not intended to limit the invention. There are various modifications and changes can be made to the invention for technical personnel in the field. Any modifications, equivalent substitutions, improvements, etc. are made within the spirit and scope of the invention are intended to be included within the scope of the invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What the claimed is:

1. An implementation method of unstructured data sharing mechanism for edge computing comprises the following steps:
    S1: receive a data index request from a user, collect switch, port, link and host information through a control plane to obtain a network topology and a status;
    S2: determine coordinates of the switch and coordinates of the data index in a virtual space formed by the network topology;
    S3: construct a switch connection diagram according to the coordinates of the switch;
    S4: insert the coordinates of the switch and forwarding entries of the switch connection diagram in a forwarding table of the switch;
    S5: a data plane greedily forwards the coordinates of the data index until being transmitted to the switch corresponding to the coordinates of the switch closest to the coordinates of the data index in the virtual space;
    S6: the switch forwards the data index of the user to an index edge server and returns a response result obtained from the index edge server to the user;
    wherein the method of determining the coordinates of the switch is obtained by constructing the shortest path matrix and using the multidimensional scaling (MDS) algorithm;
    wherein the method of determining the coordinates of the switch comprises the following steps:
    S201: compute the squared distance matrix $L^{(2)}=[l_{ij}^2]$;
    S202: construct the scalar product matrix B by multiplying the squared distance matrix $L^{(2)}$ with the matrix $$J = I - \frac{1}{n}A;$$

that is $B=\frac{1}{2}JL^{(2)}J$, where n is the number of switches, A is the squared matrix with all elements are 1;
    S203: determine m largest eigenvalues and corresponding eigenvectors of the matrix B, where m is the number of dimensions; and
    S204: compute the coordinates of the switches $U=Q_m \Lambda^{1/2}_m$, where $Q_m$ is the matrix of m eigenvectors and $\Lambda^{1/2}_m$ is the diagonal matrix of m eigenvalues of the matrix B, respectively.

2. The implementation method of unstructured data sharing mechanism for edge computing as defined in claim 1, wherein the method of determining the coordinates of the switch is implemented through constructing the shortest path matrix, while the method of determining the coordinates of the data index is determined by using the hash function SHA-256 algorithm.

3. The implementation method of unstructured data sharing mechanism for edge computing as defined in claim 1, wherein the switch connection diagram constructed based on the coordinates of the switch is a Delaunay triangulation diagram constructed by using the random increment algorithm.

4. The implementation method of unstructured data sharing mechanism for edge computing as defined in claim 1, wherein the criterion for the greedy forwarding is that the switch in which the data index packet is located forwards the data index packet to the neighbor switch closest to the coordinate of the data index, including physical neighbor and Delaunay triangulation (DT) neighbor.

5. The implementation method of unstructured data sharing mechanism for edge computing as defined in claim 4, wherein the switch uses the virtual coordinates of its physical and DT neighbors and the coordinate p=H(d) of the data index to compute estimated distances; for each physical neighbor v, switch u computes the estimated distance $Rv=Dis(v,d)$, wherein d indicates the coordinate position of the data index to be queried in the virtual space, Rv is the Euclidean distance from v to d in the virtual space; for every DT neighbor $\tilde{v}$, switch u computes the estimated distance from $\tilde{v}$ to d by $R_{\tilde{v}}=Dis(\tilde{v},d)$; switch u selects the neighbor switch $R_{v^*}$ that makes $R_{v^*}=\min\{R_v,R_{\tilde{v}}\}$; when $R_{v^*}<Dis(u,d)$, if v* is physical neighbor, switch u sends the packet to v* directly; if v* is DT neighbor, u sends the virtual link to v*; if $R_{v^*}<Dis(u, d)$ is not satisfied, switch u is closest to the coordinate of the data index, then switch u forwards the data index to its indexing edge server directly.

6. The implementation method of unstructured data sharing mechanism for edge computing as defined in claim 5, wherein when the switch receives a packet being forwarded in the virtual link, the packet is processed as follows:
    when switch u has received a data index d to forward, switch u stores it with the format: d=<d.des; d.src; d.relay; d.index> in a local data structure, where d.des is the DT neighboring switch of the source switch d.src, d.delay is the relay switch and d.index is the payload of the data index; when d.relay≠null, the data index d is traversing a virtual link.

7. The implementation method of unstructured data sharing mechanism for edge computing as defined in claim 6, wherein the method of the switch processing the packet is as follows:
    when u=d.des is found to be true, switch u is the DT neighboring switch, which is the endpoint of the virtual link; switch u will continue to forward the data index d to its neighbor, which is closest to the coordinate of the data index in the virtual space;
    when u=d.succ, switch u first finds tuple t from the forwarding table, wherein t.des=d.des; switch u revises d.relay=t.succ based on the matched tuple t, wherein d.succ is the successor switch in the forwarding path, t.des is one attribute in a flow table entry in the forwarding table as well as the identifier of the destination switch to which it is forwarded; switch u is to transmit the data index to d.relay.

8. An implementation system of an unstructured data sharing mechanism for edge computing, comprising: a memory, a processor, and a computer program stored on the memory and executable on the processor, wherein the processor executes the computer program to implement the steps comprising the following steps:

S1: receive a data index request from a user, collect switch, port, link and host information through a control plane to obtain a network topology and a status;

S2: determine coordinates of the switch and coordinates of the data index in a virtual space formed by the network topology;

S3: construct a switch connection diagram according to the coordinates of the switch;

S4: insert the coordinates of the switch and forwarding entries of the switch connection diagram in a forwarding table of the switch;

S5: a data plane greedily forwards the coordinates of the data index until being transmitted to the switch corresponding to the coordinates of the switch closest to the coordinates of the data index in the virtual space;

S6: the switch forwards the data index of the user to an index edge server and returns a response result obtained from the index edge server to the user, wherein the method of determining the coordinates of the switch is obtained by constructing the shortest path matrix and using the MDS algorithm; and wherein the method of determining the coordinates of the switch comprises the following steps:

S201: compute the squared distance matrix $L^{(2)}=[l_{ij}^2]$;

S202: construct the scalar product matrix B by multiplying the squared distance matrix $L^{(2)}$ with the matrix $$J = I - \frac{1}{n}A;$$

that is $B=\frac{1}{2}JL^{(2)}J$, where n is the number of switches, A is the squared matrix with all elements are 1;

S203: determine m largest eigenvalues and corresponding eigenvectors of the matrix B, where m is the number of dimensions; and S204: compute the coordinates of the switches $U=Q_m \Lambda^{1/2}_m$, where $Q_m$ is the matrix of m eigenvectors and $\Lambda^{1/2}_m$ is the diagonal matrix of m eigenvalues of the matrix B, respectively.

9. The implementation method of unstructured data sharing mechanism for edge computing as defined in claim 8, wherein the method of determining the coordinates of the switch is implemented through constructing the shortest path matrix, while the method of determining the coordinates of the data index is determined by using the hash function SHA-256 algorithm.

10. The implementation system as defined in claim 8, wherein the switch connection diagram constructed based on the coordinates of the switch is a Delaunay triangulation diagram constructed by using the random increment algorithm.

11. The implementation system as defined in claim 8, wherein the criterion for the greedy forwarding is that the switch in which the data index packet is located forwards the data index packet to the neighbor switch closest to the coordinate of the data index, including physical neighbor and DT neighbor.

12. The implementation system as defined in claim 11, wherein the switch uses the virtual coordinates of its physical and DT neighbors and the coordinate p=H(d) of the data index to compute estimated distances; for each physical neighbor v, switch u computes the estimated distance Rv=Dis(v, d), wherein d indicates the coordinate position of the data index to be queried in the virtual space, Rv is the Euclidean distance from v to d in the virtual space; for every DT neighbor $\tilde{v}$, switch u computes the estimated distance from $\tilde{v}$ to d by $R_{\tilde{v}}=Dis(\tilde{v}, d)$; switch u selects the neighbor switch $R_{v*}$ that makes $R_{v*}=\min\{R_v, R_{\tilde{v}}\}$; when $R_{v*}<Dis(u, d)$, if v* is physical neighbor, switch u sends the packet to v* directly; if v* is DT neighbor, u sends the virtual link to v*; if $R_{v*}<Dis(u, d)$ is not satisfied, switch u is closest to the coordinate of the data index, then switch u forwards the data index to its indexing edge server directly.

13. The implementation system as defined in claim 12, wherein when the switch receives a packet being forwarded in the virtual link, the packet is processed as follows:

when switch u has received a data index d to forward, switch u stores it with the format: d=<d.des; d.src; d.relay; d.index> in a local data structure, where d.des is the DT neighboring switch of the source switch d.src, d.relay is the relay switch and d.index is the payload of the data index; when d.relay≠null, the data index d is traversing a virtual link.

14. The implementation system as defined in claim 13, wherein the method of the switch processing the packet is as follows:

when u=d.des is found to be true, switch u is the DT neighboring switch, which is the endpoint of the virtual link; switch u will continue to forward the data index d to its neighbor, which is closest to the coordinate of the data index in the virtual space;

when u=d.succ, switch u first finds tuple t from the forwarding table, wherein t.des=d.des; switch u revises d.relay=t.succ based on the matched tuple t, wherein d.succ is the successor switch in the forwarding path, t.des is one attribute in a flow table entry in the forwarding table as well as the identifier of the destination switch to which it is forwarded; switch u is to transmit the data index to d.relay.

* * * * *